(12) United States Patent
Engquist et al.

(10) Patent No.: US 6,956,307 B2
(45) Date of Patent: Oct. 18, 2005

(54) SOFT MAGNETIC COMPOSITE POWDER METAL CORES

(75) Inventors: John Engquist, Saint Charles, IL (US); Ed Wegner, West Allis, WI (US)

(73) Assignee: Amsted Industries Incorporated, Chicago, IL (US)

( * ) Notice: Subject to any disclaimer, the term of this patent is extended or adjusted under 35 U.S.C. 154(b) by 0 days.

(21) Appl. No.: 10/794,627

(22) Filed: Mar. 8, 2004

(65) Prior Publication Data

US 2005/0194845 A1    Sep. 8, 2005

(51) Int. Cl.[7] ............................................. H02K 15/12

(52) U.S. Cl. ........................ 310/44; 310/216; 310/254

(58) Field of Search ............................ 310/43–45, 216, 310/254, 258–259

(56) References Cited

U.S. PATENT DOCUMENTS

| 5,592,731 A | * | 1/1997 | Huang et al. ................. 29/596 |
| 6,300,702 B1 | | 10/2001 | Jack et al. |
| 6,441,530 B1 | | 8/2002 | Petersen |

\* cited by examiner

*Primary Examiner*—Thanh Lam
(74) *Attorney, Agent, or Firm*—Edward J. Brosius

(57) ABSTRACT

A stator core assembly for use in an electrical machine is provided. The stator core assembly includes a plurality of core components. Each core component forms an arcuate section of the stator core assembly. Each core component is comprised of at least two core component sections, with each core component section adjacent another core component section. Each core component section is formed of a ferrous magnetic powder metal particles which are generally mutually insulated. Such ferrous magnetic powder metal particles are pressure formed into the core component section.

1 Claim, 1 Drawing Sheet

SOFT MAGNETIC COMPOSITE POWDER METAL CORES

BACKGROUND OF THE INVENTION

The present invention relates to core components for use in electrical machines and, more particularly, a stator core assembly for use in an electrical machine, most typically an electrical motor.

Electrical machines such as motors and generators have a stationary element, usually termed as stator, and movable or rotating elements, typically termed the rotor. The interaction between the stator and the rotor is caused by the interaction of a magnetic field generated by either the stator or the rotor. Such magnetic field is usually generated or induced by electric currents in a winding placed on either the stator or the rotor. Such winding usually comprises a plurality of coils wound about a winding support. The winding support is usually comprised of a soft magnetic material which traditionally is made of laminations of materials of selected steel materials. The laminations are insulated from each other in order to reduce eddy currents.

It has become known to replace the laminated steel components of stator or rotor cores with ferro-magnetic particles that are compacted in a powder metallurgy operation to form the winding support. The ferro-magnetic particles themselves are essentially electrically insulated from each other so that the resulting compacted product exhibits a low eddy current loss in a manner similar to the prior art use of a stack of steel laminations. Such use of compacted metal powders comprised of ferro-magnetic particles for cores in electrical machines is disclosed in U.S. Pat. Nos. 6,300,702 and 6,441,530.

It is another object of the present invention to provide an improved core component for use in electrical machines wherein the core comprises at least two core component sections, each formed of a compacted ferrous magnetic powder.

SUMMARY OF THE INVENTION

The present invention provides an improved stator assembly for an electrical machine. More specifically, the present invention provides an improved stator core for use in an electrical motor or generator. The improved stator core comprises a plurality of core components. Each core component forms an arcuate section of the stator core assembly, which is understood to be a generally cylindrical structure. Each core component itself comprises at least two core component sections. Each core component section is adjacent another core component section along a circumferential plane of the stator core assembly.

Further, each core component section is formed of ferrous magnetic metal powder particles. Such particles are further processed to be generally mutually insulated. The ferrous magnetic metal powder particles are pressure formed into the core component section form.

It is a feature of the present invention that such an improved core assembly comprised of a plurality of core component sections formed of mutually insulated ferrous magnetic powder metal particles provides improved performance due to the reduced eddy current losses in the electrical machine.

It is a further feature of the present invention that the stator core assembly core components include winding supports. These winding supports are comprised of at least two core component sections. Due to the use of the pressure formed ferrous magnetic powder metal particles, the winding support has a generally rounded and smooth outer profile. This is a desirable feature as the wire windings around such winding supports would not be subject to contact with sharp edges which could otherwise damage the insulation of the wire windings and lead to reduced performance and even failure of the electrical machine.

DESCRIPTION OF THE PREFERRED EMBODIMENTS

Figure 1:
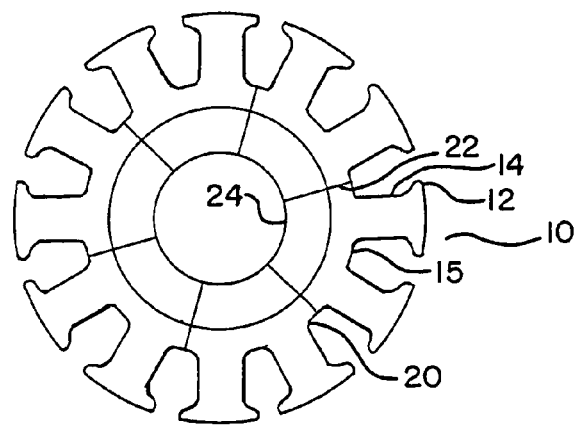
FIG. 1 is an axial view of a stator of an electrical machine in accordance with an embodiment of the present invention.

Referring now to FIG. 1 of the drawings, a stator core assembly is shown generally at 10. The stator core assembly is seen to be comprised of a base section 20, which is generally circular in shape, having an inner surface 24. Extending outwardly from base section 20 are a plurality of winding supports 14. Each winding support is seen to be a generally arcuate structure having rounded surfaces. Stator section flux surfaces 12 are seen to be expanded at the end of each winding support 14. It is understood that winding supports 14 are of a generally rounded smooth outer profile due to the subsequent winding of wires about winding support 14 in the assembly of the electrical machine, such as a generator or motor.

Figure 2:
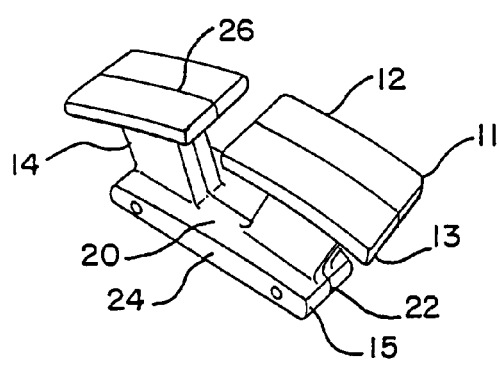
FIG. 2 is a perspective view of two core component sections combined to form a core component in accordance with the present invention.
Figure 3:
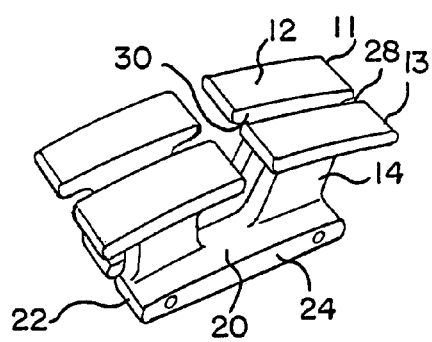
FIG. 3 is a perspective view of two core component sections separated from each other for this view.

Referring now to FIGS. 2 and 3, a detailed perspective view of a stator section 11 is shown. Stator assembly 10 is seen to be comprised of a plurality of core components 15.

Referring now to FIG. 2, stator core component 15 is seen to be comprised of stator section 11 and stator section 13. Stator section 11 and stator section 13 are similar in that each is comprised of a base section 20 having an inner surface 24. Base section 20 is seen to have an adjoining surface 22 which is adjacent and abuts a similar adjoining surface of an adjacent core component to form the stator core assembly as seen in FIG. 1.

Stator core section 13 is seen to be further comprised of winding support 14 extending radially outwardly from base section 20. Stator section flux surface 12 is seen to be an expanded portion at the end of winding support 14. It should be understood that winding support 14, base section 20, and stator section flux surface 12 are identical whether part of stator section 11 or stator section 13.

In FIG. 2, stator section 11 and stator section 13 are seen to be adjacent along joining plane 26. In FIG. 3, adjoining surface 28 of stator section 13 is seen to be spaced from adjoining surface 30 of stator section 11. It should be understood that appropriate insulating material such as an oxide layer is utilized to electrically insulate adjoining surface 28 from adjoining surface 30.

It should also be understood that winding support 14, when adjacent a similar winding support in both stator section 11 and stator section 13 combine to form a generally rounded and smooth outer profile winding support. This is desirable due to the subsequent winding of electrical wires about winding support 14 such that the insulation on such wires will not be subjected to a sharp surface or corner type edge. This could lead to reduced performance of the stator core assembly or even failure of the electrical machine.

Figure 4:
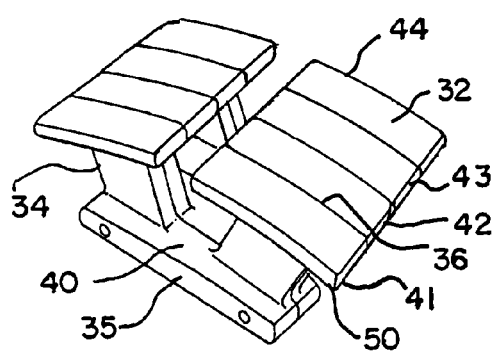
FIG. 4 is a perspective view of four core component sections combined to form a core component.
Figure 5:
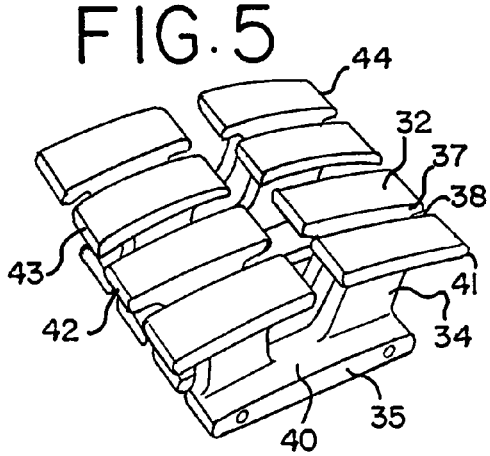
FIG. 5 is a perspective view of four core component sections separated for this view.

Referring now to FIGS. 4 and 5, the second embodiment of the present invention is shown. Stator core component 50 comprises stator sections 41, 42, 43, and 44. All of stator sections 41, 42, 43, and 44 are identical except for the outer surface rounded edges of sections 41 and 44, so the detailed explanation of stator section 41 will be equally applicable to the other stator sections. Stator section 41 is seen to comprise a base section 35 that is an arcuate section ultimately forming a circular structure of the core assembly. Base section 40 includes an inner surface 35 that is generally circular in nature. Extending radially outwardly from base section 40 are a plurality of winding supports 34. Winding supports 34 are seen to have generally an arcuate or rounded outer surfaces. The stator section flux surface 32 is seen to be an expanded outer edge of winding support 34.

Stator section 41 is seen to be adjacent to abut stator section 42 along junction 36. Similar junctions are present between stator sections 42 and 43, and 43 and 44.

A view of FIG. 4 shows stator sections 41, 42, 43, and 44 assembled in an abutting relationship, whereas the view of FIG. 5 shows each of stator sections 41, 42, 43, and 44 separated from each other.

It should be understood that the abutting surfaces between stator section 41 and 42 are generally flat but also including an insulating material such that stator section 41 and 42 are electrically insulated from each other. Similar comments can be made to the adjoining sections of stator sections 42 and 43, and 43 and 44.

While it is understood that winding supports 34 include a flat section abutting the adjacent winding support section of the adjacent stator section, the outer surfaces of winding support 34 are of a generally rounded and smooth outer profile. This is desirable as electrical wires are ultimately wound about winding support 34 to form the desirable coil structure for the electrical machine that the core component 50 ultimately forms a portion of the stator core assembly.

What is claimed is:

1. A stator core assembly for use in an electrical machine, the stator core assembly comprising a plurality of core components, each core component having a flux transfer surface, a winding support section extending radially from the flux transfer surface, and a base section into which the winding support section extends, each core component forming an arcuate section of the stator core assembly, each core component comprised of a plurality of core component sections, each core component section adjacent another core component section along a circumferential plane of the stator core assembly, each core component section ferrous magnetic metal powder particles being generally mutually insulated and pressure formed into the core component section, wherein each core component section is insulated from each adjacent core component section, and wherein each core winding support section has a generally rounded and smooth outer surface for receiving a core winding therearound.

* * * * *